United States Patent [19]
Cearlock et al.

[11] Patent Number: 4,657,626
[45] Date of Patent: Apr. 14, 1987

[54] FRICTION WELDING TOOL

[75] Inventors: Steven V. Cearlock, Batavia; Francis C. Peterson, St. Charles; Gene S. Kunos, Elgin, all of Ill.

[73] Assignee: Illinois Tool Works Inc., Chicago, Ill.

[21] Appl. No.: 637,347

[22] Filed: Aug. 6, 1984

Related U.S. Application Data

[62] Division of Ser. No. 446,899, Dec. 6, 1982, Pat. No. 4,477,307.

[51] Int. Cl.⁴ .............................................. B30B 3/00
[52] U.S. Cl. ................................. 156/580; 156/73.5; 53/317; 53/329; 228/2; 228/113
[58] Field of Search ............... 156/64, 73.5, 359, 328, 156/580.1, 580.2, 580, 358, 580.2, 581, 582; 228/2, 112.3; 24/90 HA, 704, 297, 456; 53/317, 329, 331

[56] References Cited

U.S. PATENT DOCUMENTS

| | | | |
|---|---|---|---|
| 1,208,529 | 12/1916 | Evans | 53/317 |
| 3,316,135 | 4/1967 | Brown | 156/580 |
| 3,499,068 | 3/1970 | Brown | 156/73.5 |
| 3,499,808 | 3/1970 | Obeda | 156/580.2 |
| 3,906,706 | 9/1975 | Conti | 53/331.5 |
| 4,140,569 | 2/1979 | Yealy | 156/73.5 |

Primary Examiner—Donald E. Czaja
Assistant Examiner—Merrell C. Cashion, Jr.
Attorney, Agent, or Firm—J. P. O'Brien; T. W. Buckman

[57] ABSTRACT

A thermoplastic fastener having a slight taper, is friction welded to a thermoplastic workpiece. A system for friction welding the fastener includes a way of automatically stopping rotation of the fastener while contact pressure between the fastener and the workpiece is maintained.

10 Claims, 5 Drawing Figures

4,657,626

FRICTION WELDING TOOL

This application is a division of application Ser. No. 446,899, filed Dec. 6, 1982, now U.S. Pat. No. 4,477,307.

BACKGROUND AND SUMMARY OF THE INVENTION

The invention relates to a system for attaching fasteners to a workpiece. In particular the invention pertains to a system for friction or spin welding thermoplastic fasteners to a thermoplastic workpiece.

Various techniques have been used to fuse thermoplastic fasteners and workpieces together. The techniques generally involve frictionally heating the interface between the fastener and the workpiece by applying contact pressure while at the same time rotating the members relative to one another. When the interface of the two members has achieved molten state the rotation is stopped while the contact pressure is maintained for a time sufficient to allow the interface to solidiify. The length of time required to achieve a molten interface depends upon a variety of factors including fastener material, workpiece material, the size and configuration of the interface, the amount of contact pressure, the speed of rotation, the thermal dissipation characteristics of the connection, the dynamic friction characteristics of the interface, and other indeterminate factors. After the molten state at the interface is achieved, it is important to continue to apply contact pressure until the interface returns to the solid state. The time required in this step varies with the materials involved.

Typical problems encountered in friction welding include insufficient amounts of interface fusion, overheating the interface to the point were combustion takes place, and malformation of the interface due to continued rotation of the fastener during the transition from molten to the solid state.

The invention comprises a system for friction welding a thermoplastic fastener to a thermoplastic workpiece which allows an installer to apply continuous contact pressure to the fastener and the workpiece, while at the same time automatically stopping rotation of the fastener. The system also eliminates the need for the installer to judge the amount of time needed to achieve the molten state of the fastener/workpiece interface. The invention also relates to a fastener/workpiece interface configuration whereby the formation of the molten state can be controlled.

The many objects and purposes of the invention will be clear upon a reading of the following detailed description in conjunction with the accompanying drawings.

DETAILED DESCRIPTION OF THE DRAWINGS

DETAILED DESCRIPTION OF THE INVENTION

Figure 1:
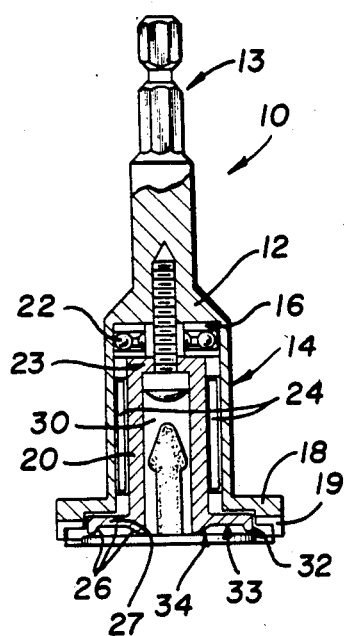
FIG. 1 is an elevational view in partial section of a tool used in the system of the present invention.

Referring to the drawings, FIG. 1 shows a tool 10 with an outer sleeve member 12 and an upper end portion 13 adapted to be held by a power tool (not shown), a mid-section 14 and a fastener driving end flange 18. Within the mid-section 14 there is an inner sleeve 20 connected to the outer sleeve member 12 by bolt 28. The inner sleeve 20 has a flange 27 at one end thereof. A thrust bearing 22 lies between a bearing surface 16 of the outer sleeve member 12 and the upper end 23 of the inner sleeve 27. Roller bearings 24 separate the sleeve portions of the inner and outer sleeve members. The inner sleeve 20 has a flange 27 with a contoured pressured surface 26 on its underside. The pressure surface 26 is comprised of an outer downwardly depending inner ring 34. The outer sleeve member 12 has a fastener driving end flange 18 with downwardly depending fastener engaging projections 19 on the periphery of the end flange 18. The inner sleeve 20 has an opening 30 adapted to receive the shank of a fastener.

Figure 3:
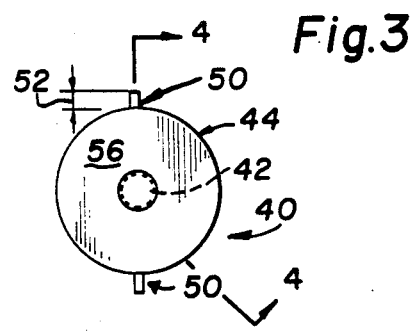
FIG. 3 is a plan view of a fastener used in the system of the present invention.
Figure 4:
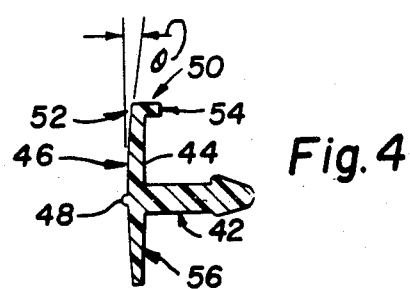
FIG. 4 is a sectibnal view, taken along line 4—4 in FIG. 3.

FIGS. 3 and 4 show a fastener 40 embodying features in accordance with the present invention. The fastener 40 has a generally stud-like primary fastening element 42 integrally formed with a base 44. The base 44 has a generally tapered lower surface 46 adapted to be fused to a workpiece. There is a central protrusion 48 extending in a direction opposite that of the primary fastening element 42. Peripheral protrusions 50 have a radial portion 52 and an axial portion 54 which extends generally in the direction of the primary fastening element 42. The upper surface 56 of the base 44 is adapted to abut the flange 27 of the inner sleeve 20 of the tool shown in FIG. 1. The peripheral protrusions 50 are adapted to engage the projections 19 of the tool shown in FIG. 1.

Obviously, the invention is not limited to fasteners having studs; in fact, any of a variety of fasteners could be used including female fasteners with only slight modifications to the tool 10 particularly in the size of the opening 30.

The operation of the system of the present invention is as follows. The primary fastening element 42 is inserted into the opening 30 of the inner sleeve 20. The peripheral protrusion 50 are fitted into spaces between the projections 19 such that the inner ring 34 and outer ring 32 abut portions of the upper surface 56. When the fastener is placed up against a workpiece rotation at the upper end portion 13 of the tool 10 is transmitted to the fastener 40 almost exclusively by the interference between the peripheral protrusions 50 and the projection 19 on the end flange 18. Axial pressure is applied to the fastener at the upper surface 56. As axial pressure is applied to the fastener during rotation of the fastener, friction causes heat to be generated at the lower surface 46 of the fastener. Because of the taper indicated by the angle $\theta$ shown in FIG. 4, heat begins to build up at the center of the lower surface 46. The heat causes the lower surface 46 to melt. As the melting progresses gradually toward the periphery of the surface 46, the strength of the radial portio 52 of the protrusion 50 is drastically reduced. Eventually, the protrusion 50 is sheared off and rotation of the fastener stops. It has been found that some increase in torque occurs with the melting of the interface, however, the main factor contributing to the failure of the protrusions 50 is the weakness due to frictional heat. At the time that the protrusions 50 fails rotational torque transmitting forces from the projections 19 are no longer transferred to the fastener. However, because the inner sleeve 20 is rotatioally independent of the outer sleeve member 12 because bearings 22 and 24, axial pressure between the fastener and the workpiece can be maintained to ensure proper fusion therebetween.

Other features of the tool include the following. As the outer sleeve 12 continues to rotate while the inner sleeve 20 and the fastener are stopping, the projections 19 tend to clean off any material which may have been extruded out from between the fastener and the workpiece. Extrusion, however, is minimized by the contoured surface 26 because the outer ring 32 of the flange 27 together with the recessed planar portion 33 tend to contain and control the outward flow of molten material. The contoured surface 26 therefore not only enhances the appearance of the friction welded connection, but also helps to make a stronger connectin by preventing the escape of molten material.

It should be noted that the inertial force of the substantially massive outer sleeve member 12 will not be transmitted to the fastener once the peripheral protrusions 50 are severed. This is significant because the solidification of the melted fastener/workpiece interface can occur rapidly, and any excessive rotation of the fastener during the solidification of the interface can cause malformation of the bond between the fastener and the workpiece.

Obviously, transmission of the inertial forces of the driving assembly to the fastener could be avoided by employing some braking mechanism, but such a solution would be cumbersome at best. And, there are other alternatives for disconnecting the drive assembly from the fastener to avoid transmission of inertial forces. However, since there is very little if any displacement of the fastener relative to the workpiece during the friction welding operation described, the rather difficult task of displacing at least a portion of the driving assembly would be required. Displacement of the fastener is also impractical because often the workpiece to which the fastener is attached is relatively thin material and displacement of the fastener would therefore cause damage to the workpiece.

The preferred embodiment of the present invention not only avoids the above problems, but also precludes the need for judgement by installer as to when to stop rotating the fastener. Because the protrusions 50 shear at a predetermined fusion condition, and because the tool employs no other torque transmitting means, the overheating of the fastener/workpiece interface is precluded.

Another feature of the present invention is the relative number of the protrusions 50 and the projections 19. Typically a fastener will be provided with two peripheral protrusions 50 and the tool 10 will have three torque transmitting projections 19. This means that torque will be transmitted to the fastener by only one protrusion 50, and the size and melting point of the protrusion can be designed to shear it off at an optimal time depending upon the size of the base 44, the material of the fastener, the axial pressure to be applied during installation, the speed of rotation of the fastener and the myriad other considerations known in the friction welding art. By having an unequal number of protrusions 50 and projections 19, a fastener can still be used if one of the protrusions 50 should happen to be damaged.

Figure 5:
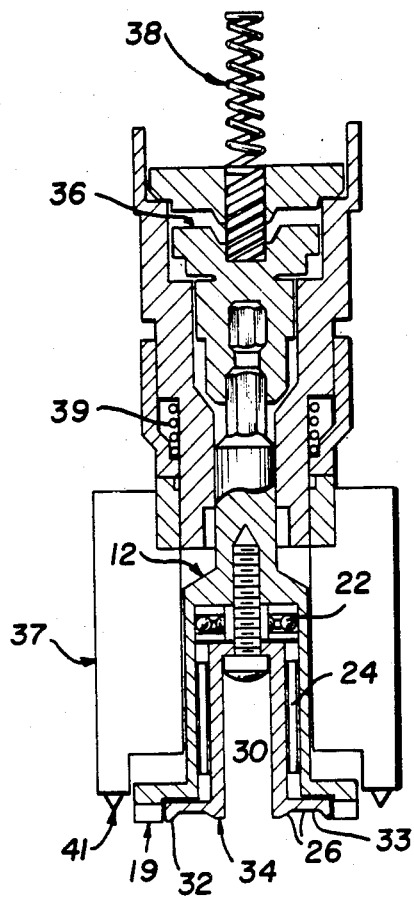
FIG. 5 is an elevational view in partial section of an alternative embodiment of a tool used in the system of the present invention.
Figure 2:
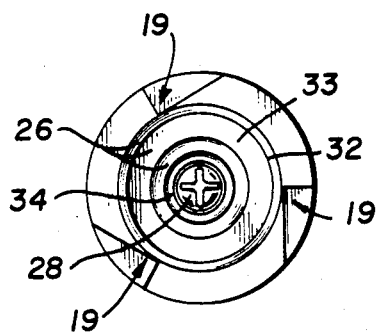
FIG. 2 is a bottom view of a tool similar to the tool shown in FIG. 1.

FIG. 5 shows an alternative embodiment of a tool of the present invention. The tool in FIG. 5 contains the entire tool shown in FIG. 1, and has additional features as follows. A stabilizing sleeve 37 surrounds the outer sleeve member 12, the sleeve 37 is spring loaded with a first spring 39. The sleeve 37 is freely rotatable about the tool 10. The sleeve 37 has points 41 to assist in locating the fastener on the workpiece. The tool of FIG. 5 includes clutch surfaces 36 held apart by a spring 38 which insures that a predetermined contact pressure is applied to the fastener before rotation of the fastener 10 occurs. The advantage of the embodiment shown in FIG. 5 is that a predetermined level and distribution of pressure can be assured with the tool, and again judgement input by the installer is reduced.

It should be noted that with certain materials the elimination of the transmission of inertial forces from the driving tool to the fastener will not be a critical consideration. In such a case it is contemplated and in accordance with the present invention that the protrusions 50 could be eliminated, and torque could be transmitted to the fastener by conventional means. In order to control the amount of fusion between the fastener and the workpiece, a timing mechanism could be incorporated into the tool which would automatically stop rotation of the fastener when a predetermined amount of fusion at the interface between the fastener and the workpiece was achieved. The timing mechanism, however, should be adjustable to accommodate various materials, fastener configurations, and other factors discussed above.

Many changes and modifications in the above described embodiments of the invention can of course be carried out without departing from the scope of the following claims.

I claim:

1. Tool for friction welding an article having drive means and a surface adapted to be fused to a workpiece, said tool comprising a rotary drive member including rotary torque applying means for contacting a portion of said article and for causing rotation of said article through engagement with said drive means, and a pressure applying member, said pressure applying member being continuously freely rotatably supported by said rotary drive member, said pressure applying member including pressure applying means for contacting another portion of said article and for applying axial pressure to said article against said workpiece to assure proper contact between said article and said workpiece both during and after rotation of said fastener.

2. A tool as described in claim 1 wherein said tool includes a load sensitive switch which begins rotation of said driving means when a predetermined axial pressure is applied to said fastener.

3. A tool as described in claim 1 wherein said rotary drive member includes an outer sleeve which substantially surrounds said pressure applying member, and said pressure applying member includes an inner sleeve adapted to continuously freely rotate within said outer sleeve, said pressure applying means including a flange at one end of said inner sleeve, said flange having a contoured surface for transmitting the axial pressure to said fastener.

4. A tool as described in claim 1 which further comprises guide means for assuring proper alignment of said fastener with respect to said workpiece.

5. A tool as described in claim 1 wherein said torque applying means includes at least one notch adapted to receive said drive means on said fastener whereby said fastener can stop rotating upon yielding of said projection and momentum of said torque applying means will thereafter not be transmitted to said fastener.

6. A tool for friction welding an article having a yielding driving protrusion and a surface adapted to be fused to a workpiece, said tool comprising an outer sleeve having one end attachable to a rotating chuck, the opposite end of said outer sleeve having at least one projection thereon, said projection adapted to engage a protrusion on said article, an inner pressure applying member adapted to abut said fastener, said inner member being continuously freely rotatable within said outer sleeve whereby rotational disengagement between a protrusion on said article and a projection on said outer sleeve can occur while axial pressure can be applied to said article through said inner member without need for axial movement of said tool.

7. A tool according to claim 6 wherein said inner member and said sleeve are separated by bearings.

8. A tool according to claim 7 wherein two sets of said bearings are used, a first set being roller bearings extending axialy and parallel to said sleeve and said inner member, a second set being thrust bearings to allow the transmission of axial force from said sleeve to said inner member without transmission of significant rotational force.

9. A tool according to claim 6 wherein said sleeve has three projections on said opposite end, said projections being generally equally spaced about the periphery of said opposite end.

10. A tool according to claim 6 wherein said inner member has an end flange with a contoured surface comprising inner and outer annular rings adapted to contain molten material created during a friction welding operation.

* * * * *